(12) United States Patent
Ishii

(10) Patent No.: US 8,934,156 B2
(45) Date of Patent: Jan. 13, 2015

(54) IMAGE PROCESSING APPARATUS, IMAGE PROCESSING METHOD, PROGRAM, AND RECORDING MEDIUM

(71) Applicant: Hiroshi Ishii, Tokyo (JP)

(72) Inventor: Hiroshi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 13/732,817

(22) Filed: Jan. 2, 2013

(65) Prior Publication Data
US 2013/0176598 A1   Jul. 11, 2013

(30) Foreign Application Priority Data

Jan. 6, 2012   (JP) ................................ 2012-001263
Feb. 20, 2012  (JP) ................................ 2012-034072

(51) Int. Cl.
H04N 1/405   (2006.01)
G06K 15/02   (2006.01)
H04N 1/60    (2006.01)

(52) U.S. Cl.
CPC .......... G06K 15/1848 (2013.01); H04N 1/6033 (2013.01); H04N 1/6097 (2013.01)
USPC ............................ 358/521; 358/504; 358/406

(58) Field of Classification Search
CPC ......... H04N 5/20; H04N 5/57; H04N 1/4072; H04N 1/6027; H04N 1/4074; H04N 1/60; H04N 1/6033; H04N 1/644; H04N 2201/04717; G06T 5/007; G06T 5/40; G06T 2207/20012
USPC ......... 358/1.9, 2.1, 3.24, 1.13, 500, 504, 406, 358/400, 515–525, 527, 468; 345/212, 690
See application file for complete search history.

(56) References Cited

U.S. PATENT DOCUMENTS

| 5,394,194 | A  | * | 2/1995  | Izawa et al. ................... 348/672 |
| 6,556,707 | B1 |   | 4/2003  | Yagishita et al. |
| 7,088,472 | B1 |   | 8/2006  | Okubo et al. |
| 7,113,227 | B1 | * | 9/2006  | Kakuya et al. ................ 348/678 |
| 2004/0257622 | A1 |   | 12/2004 | Shibaki et al. |
| 2006/0077466 | A1 |   | 4/2006  | Ishii et al. |
| 2007/0127837 | A1 |   | 6/2007  | Ishii |
| 2010/0118347 | A1 |   | 5/2010  | Ishii |
| 2010/0309498 | A1 |   | 12/2010 | Ishii |
| 2011/0158667 | A1 |   | 6/2011  | Ishii |
| 2011/0176152 | A1 |   | 7/2011  | Ishii |

FOREIGN PATENT DOCUMENTS

| EP | 1411714 A2 * | 4/2004 |
| JP | 2004-208168  | 7/2004 |
| JP | 2008-17275   | 1/2008 |
| JP | 2010-263345  | 11/2010 |

* cited by examiner

Primary Examiner — Thomas D Lee
Assistant Examiner — Stephen M Brinich
(74) Attorney, Agent, or Firm — Cooper & Dunham LLP

(57) ABSTRACT

In an image processing apparatus and an image processing method according to the present invention, a gradation correction table creation unit prints stored chart data on a print paper by an image forming device, determines a target color from the color measuring result of the printed chart by a color measuring device, and creates a gray reproduction estimation model function according to the measured color result of the chart. Next, after the gradation correction table is created such that the gray of each gradation is adequately close to the target color, the gradation correction table is changed such that the color difference of neighboring gradations is included in a predetermined range.

13 Claims, 21 Drawing Sheets

FIG.7

| PATCH | GRADATION VALUE | L* |
|---|---|---|
| K00 | 0 | 95.1 |
| K01 | 8 | 93.4 |
| K02 | 16 | 90.4 |
| K03 | 24 | 88.5 |
| K04 | 32 | 85.8 |
| K05 | 40 | 81.8 |
| K06 | 48 | 79.7 |
| K07 | 56 | 77.7 |
| K08 | 64 | 74.8 |
| K09 | 72 | 72.6 |
| K10 | 80 | 70.1 |
| K11 | 88 | 67.5 |
| K12 | 96 | 63.9 |
| K13 | 104 | 63.0 |
| K14 | 112 | 60.1 |
| K15 | 120 | 57.6 |
| K16 | 128 | 55.6 |
| K17 | 136 | 53.1 |
| K18 | 144 | 50.4 |
| K19 | 152 | 47.6 |
| K20 | 160 | 46.0 |
| K21 | 168 | 43.2 |
| K22 | 176 | 40.8 |
| K23 | 184 | 38.0 |
| K24 | 192 | 36.6 |
| K25 | 200 | 31.9 |
| K26 | 208 | 29.1 |
| K27 | 216 | 27.5 |
| K28 | 224 | 24.6 |
| K29 | 232 | 22.9 |
| K30 | 240 | 20.0 |
| K31 | 248 | 18.6 |
| K32 | 255 | 16.5 |

FIG.8

| PATCH | GRADATION VALUE | L* |
|---|---|---|
| K00 | 0 | 95.1 |
| K01 | 8 | 92.6 |
| K02 | 16 | 90.2 |
| K03 | 24 | 87.7 |
| K04 | 32 | 85.2 |
| K05 | 40 | 82.8 |
| K06 | 48 | 80.3 |
| K07 | 56 | 77.8 |
| K08 | 64 | 75.4 |
| K09 | 72 | 72.9 |
| K10 | 80 | 70.4 |
| K11 | 88 | 68.0 |
| K12 | 96 | 65.5 |
| K13 | 104 | 63.0 |
| K14 | 112 | 60.6 |
| K15 | 120 | 58.1 |
| K16 | 128 | 55.7 |
| K17 | 136 | 53.2 |
| K18 | 144 | 50.7 |
| K19 | 152 | 48.3 |
| K20 | 160 | 45.8 |
| K21 | 168 | 43.3 |
| K22 | 176 | 40.9 |
| K23 | 184 | 38.4 |
| K24 | 192 | 35.9 |
| K25 | 200 | 33.5 |
| K26 | 208 | 31.0 |
| K27 | 216 | 28.5 |
| K28 | 224 | 26.1 |
| K29 | 232 | 23.6 |
| K30 | 240 | 21.1 |
| K31 | 248 | 18.7 |
| K32 | 255 | 16.5 |

TARGET COLOR (BLACK) FOR EACH GRADATION VALUE

FIG.9

| PATCH | GRADATION VALUE | L* | a* | b* |
|---|---|---|---|---|
| T00 | 0 | 95.2 | 0.4 | -3.4 |
| T32 | 255 | 21.4 | -2.3 | 7.4 |

COLOR MEASUREMENT RESULT (GRAY)

FIG.10

| PATCH | GRADATION VALUE | L* | a* | b* |
|---|---|---|---|---|
| T00 | 0 | 95.1 | 0.4 | -3.6 |
| T01 | 8 | 92.6 | 0.1 | -3.5 |
| T02 | 16 | 90.2 | -0.1 | -3.4 |
| T03 | 24 | 87.7 | -0.3 | -3.3 |
| T04 | 32 | 85.2 | -0.6 | -3.2 |
| T05 | 40 | 82.8 | -0.8 | -3.1 |
| T06 | 48 | 80.3 | -1.1 | -3.0 |
| T07 | 56 | 77.8 | -1.3 | -2.9 |
| T08 | 64 | 75.4 | -1.5 | -2.9 |
| T09 | 72 | 72.9 | -1.8 | -2.8 |
| T10 | 80 | 70.4 | -2.0 | -2.7 |
| T11 | 88 | 68.0 | -2.3 | -2.6 |
| T12 | 96 | 65.5 | -2.5 | -2.5 |
| T13 | 104 | 63.0 | -2.5 | -2.5 |
| T14 | 112 | 60.6 | -2.5 | -2.5 |
| T15 | 120 | 58.1 | -2.5 | -2.5 |
| T16 | 128 | 55.7 | -2.5 | -2.5 |
| T17 | 136 | 53.2 | -2.5 | -2.5 |
| T18 | 144 | 50.7 | -2.5 | -2.5 |
| T19 | 152 | 48.3 | -2.5 | -2.5 |
| T20 | 160 | 45.8 | -2.5 | -2.5 |
| T21 | 168 | 43.3 | -2.5 | -2.5 |
| T22 | 176 | 40.9 | -2.5 | -2.5 |
| T23 | 184 | 38.4 | -2.5 | -2.5 |
| T24 | 192 | 35.9 | -2.5 | -2.5 |
| T25 | 200 | 34.1 | -2.5 | -2.3 |
| T26 | 208 | 32.2 | -2.5 | -1.9 |
| T27 | 216 | 30.4 | -2.5 | -1.1 |
| T28 | 224 | 28.5 | -2.5 | 0.0 |
| T29 | 232 | 26.7 | -2.4 | 1.5 |
| T30 | 240 | 24.9 | -2.4 | 3.2 |
| T31 | 248 | 23.0 | -2.3 | 5.3 |
| T32 | 255 | 21.4 | -2.3 | 7.4 |

TARGET COLOR (GRAY) FOR EACH GRADATION VALUE

FIG.11

| INPUT GRADATION VALUE | OUTPUT GRADATION VALUE |
|---|---|
| 0 | 0 |
| 8 | 10 |
| 16 | 17 |
| 24 | 26 |
| 32 | 33 |
| 40 | 38 |
| 48 | 46 |
| 56 | 56 |
| 64 | 63 |
| 72 | 71 |
| 80 | 79 |
| 88 | 87 |
| 96 | 92 |
| 104 | 104 |
| 112 | 111 |
| 120 | 118 |
| 128 | 128 |
| 136 | 136 |
| 144 | 143 |
| 152 | 150 |
| 160 | 161 |
| 168 | 168 |
| 176 | 176 |
| 184 | 183 |
| 192 | 193 |
| 200 | 197 |
| 208 | 203 |
| 216 | 211 |
| 224 | 220 |
| 232 | 229 |
| 240 | 237 |
| 240 | 237 |
| 255 | 255 |

GRADATION CORRECTION TABLE (BLACK)

FIG.13

|  | GRADATION VALUE | LOWER LIMIT | UPPER LIMIT |
|---|---|---|---|
| T00 | 0 |  |  |
| T01 | 8 | 1.0 | 4.0 |
| T02 | 16 | 1.0 | 4.0 |
| T03 | 24 | 1.0 | 4.0 |
| T04 | 32 | 1.0 | 4.0 |
| T05 | 40 | 1.0 | 4.0 |
| T06 | 48 | 1.0 | 4.0 |
| T07 | 56 | 1.0 | 4.0 |
| T08 | 64 | 1.0 | 4.0 |
| T09 | 72 | 1.0 | 4.0 |
| T10 | 80 | 1.0 | 4.0 |
| T11 | 88 | 1.0 | 4.0 |
| T12 | 96 | 1.0 | 4.0 |
| T13 | 104 | 1.0 | 4.0 |
| T14 | 112 | 1.0 | 4.0 |
| T15 | 120 | 1.0 | 4.0 |
| T16 | 128 | 1.0 | 4.0 |
| T17 | 136 | 1.0 | 4.0 |
| T18 | 144 | 1.0 | 4.0 |
| T19 | 152 | 1.0 | 4.0 |
| T20 | 160 | 1.0 | 4.0 |
| T21 | 168 | 1.0 | 4.0 |
| T22 | 176 | 1.0 | 4.0 |
| T23 | 184 | 1.0 | 4.0 |
| T24 | 192 | 1.0 | 4.0 |
| T25 | 200 | 0.4 | 3.4 |
| T26 | 208 | 0.4 | 3.4 |
| T27 | 216 | 0.5 | 3.5 |
| T28 | 224 | 0.6 | 3.6 |
| T29 | 232 | 0.8 | 3.8 |
| T30 | 240 | 0.9 | 3.9 |
| T31 | 248 | 1.1 | 4.1 |
| T32 | 255 | 0.8 | 3.8 |

TOLERANCE RANGE OF COLOR DIFFERENCE OF NEIGHBORING GRADATIONS (GRAY)

| | GRADATION VALUE | 1ST TIME | 2ND TIME | 3RD TIME |
|---|---|---|---|---|
| T00 | 0 | 0.15 | 0.17 | 0.19 |
| T01 | 8 | 0.36 | 0.16 | 0.38 |
| T02 | 16 | 0.73 | 0.31 | 0.65 |
| T03 | 24 | 0.97 | 0.50 | 0.90 |
| T04 | 32 | 1.26 | 0.69 | 1.11 |
| T05 | 40 | 1.11 | 0.75 | 1.30 |
| T06 | 48 | 1.01 | 0.31 | 1.18 |
| T07 | 56 | 0.65 | 0.54 | 0.75 |
| T08 | 64 | 1.17 | 0.29 | 0.90 |
| T09 | 72 | 0.73 | 0.60 | 0.66 |
| T10 | 80 | 1.07 | 0.26 | 1.09 |
| T11 | 88 | 0.49 | 0.29 | 1.20 |
| T12 | 96 | 0.65 | 0.35 | 1.09 |
| T13 | 104 | 0.64 | 0.61 | 0.88 |
| T14 | 112 | 1.18 | 0.48 | 1.16 |
| T15 | 120 | 1.57 | 0.85 | 0.82 |
| T16 | 128 | 1.51 | 0.26 | 1.44 |
| T17 | 136 | 1.08 | 1.47 | 2.67 |
| T18 | 144 | 1.75 | 0.86 | 1.60 |
| T19 | 152 | 0.62 | 1.18 | 1.40 |
| T20 | 160 | 0.57 | 0.96 | 1.15 |
| T21 | 168 | 1.11 | 0.59 | 0.96 |
| T22 | 176 | 0.48 | 0.54 | 1.45 |
| T23 | 184 | 0.38 | 0.70 | 1.17 |
| T24 | 192 | 0.65 | 0.60 | 2.46 |
| | SUM OF PREDETERMINED RANGE | 21.9 | 14.3 | 28.6 |

FIG.18

| CYAN | GRADATION VALUE | MEASURED COLOR VALUE | | |
|---|---|---|---|---|
| | | L* | a* | b* |
| C0 | 0 | 95.23 | 0.41 | -3.50 |
| C1 | 8 | 94.63 | -0.16 | -4.10 |
| C2 | 16 | 93.90 | -0.92 | -5.16 |
| C3 | 24 | 92.65 | -2.20 | -6.84 |
| C4 | 32 | 91.75 | -3.04 | -8.14 |
| C5 | 40 | 90.68 | -4.02 | -9.46 |
| C6 | 48 | 89.44 | -5.11 | -11.19 |
| C7 | 56 | 87.97 | -6.36 | -13.08 |
| C8 | 64 | 86.55 | -7.45 | -14.86 |
| C9 | 72 | 84.90 | -8.73 | -16.86 |
| C10 | 80 | 83.34 | -9.83 | -18.80 |
| C11 | 88 | 81.36 | -11.13 | -21.07 |
| C12 | 96 | 79.66 | -12.18 | -23.07 |
| C13 | 104 | 77.94 | -13.39 | -25.05 |
| C14 | 112 | 75.90 | -14.64 | -27.53 |
| C15 | 120 | 73.92 | -16.00 | -29.74 |
| C16 | 128 | 72.35 | -16.94 | -31.55 |
| C17 | 136 | 70.42 | -18.09 | -33.63 |
| C18 | 144 | 68.32 | -19.29 | -35.93 |
| C19 | 152 | 66.68 | -20.20 | -37.70 |
| C20 | 160 | 65.35 | -21.00 | -39.15 |
| C21 | 168 | 63.45 | -22.26 | -41.28 |
| C22 | 176 | 61.70 | -23.40 | -43.33 |
| C23 | 184 | 59.32 | -24.95 | -46.04 |
| C24 | 192 | 57.36 | -26.04 | -48.08 |
| C25 | 200 | 55.90 | -26.96 | -49.60 |
| C26 | 208 | 54.75 | -27.26 | -50.76 |
| C27 | 216 | 52.89 | -27.69 | -52.40 |
| C28 | 224 | 52.55 | -27.85 | -52.67 |
| C29 | 232 | 50.94 | -27.77 | -53.99 |
| C30 | 240 | 50.67 | -27.78 | -54.22 |
| C31 | 248 | 49.64 | -27.47 | -54.93 |
| C32 | 255 | 47.13 | -26.42 | -56.43 |

FIG.19

| GRADATION VALUE | L* | a* | b* | COLOR DIFFERENCE | INTEGRATED COLOR DIFFERENCE |
|---|---|---|---|---|---|
| 0 | 95.23 | 0.41 | -3.50 | | 0 |
| 1 | 95.16 | 0.34 | -3.57 | 0.12 | 0.12 |
| 2 | 95.08 | 0.27 | -3.65 | 0.13 | 0.25 |
| 3 | 95.01 | 0.20 | -3.72 | 0.12 | 0.38 |
| 4 | 94.93 | 0.12 | -3.80 | 0.14 | 0.51 |
| 5 | 94.86 | 0.05 | -3.87 | 0.12 | 0.64 |
| 6 | 94.78 | -0.02 | -3.95 | 0.13 | 0.77 |
| 7 | 94.71 | -0.09 | -4.03 | 0.13 | 0.90 |
| 8 | 94.63 | -0.16 | -4.10 | 0.13 | 1.02 |
| 9 | 94.54 | -0.26 | -4.23 | 0.19 | 1.21 |
| 10 | 94.45 | -0.35 | -4.37 | 0.19 | 1.40 |
| 11 | 94.36 | -0.44 | -4.50 | 0.18 | 1.58 |
| 12 | 94.27 | -0.54 | -4.63 | 0.19 | 1.77 |
| 13 | 94.17 | -0.63 | -4.76 | 0.19 | 1.96 |
| 14 | 94.08 | -0.73 | -4.90 | 0.19 | 2.15 |
| 15 | 93.99 | -0.82 | -5.03 | 0.18 | 2.33 |
| 16 | 93.90 | -0.92 | -5.16 | 0.19 | 2.52 |
| 17 | 93.74 | -1.08 | -5.37 | 0.31 | 2.83 |
| 18 | 93.59 | -1.24 | -5.58 | 0.30 | 3.13 |
| 19 | 93.43 | -1.40 | -5.79 | 0.31 | 3.44 |
| 20 | 93.27 | -1.56 | -6.00 | 0.31 | 3.75 |
| 21 | 93.12 | -1.72 | -6.21 | 0.30 | 4.05 |
| 22 | 92.96 | -1.88 | -6.42 | 0.31 | 4.36 |
| 23 | 92.81 | -2.04 | -6.63 | 0.30 | 4.66 |
| 24 | 92.65 | -2.20 | -6.84 | 0.31 | 4.97 |
| 25 | 92.54 | -2.30 | -7.00 | 0.22 | 5.19 |
| ... | ... | ... | ... | ... | ... |

FIG.20

| GRAY | GRADATION VALUE | MEASURED COLOR VALUE | | | LINEAR INTERPOLATION | | | ΔE |
|---|---|---|---|---|---|---|---|---|
| | | L* | a* | b* | L* | a* | b* | |
| T0 | 0 | 95.19 | 0.38 | -3.44 | | | | |
| T1 | 8 | 93.77 | 0.24 | -3.50 | 93.74 | 0.11 | -3.32 | 0.22 |
| T2 | 16 | 92.29 | -0.16 | -3.21 | 91.97 | -0.24 | -3.55 | 0.48 |
| T3 | 24 | 90.16 | -0.73 | -3.60 | 90.41 | -0.42 | -2.89 | 0.82 |
| T4 | 32 | 88.52 | -0.69 | -2.56 | 88.07 | -1.04 | -3.59 | 1.18 |
| T5 | 40 | 85.98 | -1.36 | -3.59 | 86.30 | -0.97 | -2.90 | 0.85 |
| T6 | 48 | 84.08 | -1.25 | -3.23 | 83.77 | -1.48 | -3.49 | 0.46 |
| T7 | 56 | 81.55 | -1.61 | -3.39 | 81.46 | -1.45 | -2.93 | 0.50 |
| T8 | 64 | 78.84 | -1.65 | -2.62 | 78.71 | -1.70 | -2.87 | 0.29 |
| T9 | 72 | 75.87 | -1.79 | -2.36 | 76.10 | -1.74 | -2.63 | 0.36 |
| T10 | 80 | 73.37 | -1.83 | -2.64 | 73.16 | -2.02 | -2.54 | 0.30 |
| T11 | 88 | 70.44 | -2.26 | -2.72 | 70.41 | -2.13 | -2.62 | 0.16 |
| T12 | 96 | 67.46 | -2.43 | -2.60 | 67.57 | -2.35 | -2.31 | 0.32 |
| T13 | 104 | 64.69 | -2.44 | -1.91 | 64.40 | -2.37 | -2.55 | 0.71 |
| T14 | 112 | 61.35 | -2.30 | -2.50 | 61.70 | -2.89 | -2.15 | 0.77 |
| T15 | 120 | 58.72 | -3.34 | -2.39 | 58.41 | -2.32 | -2.45 | 1.07 |
| T16 | 128 | 55.47 | -2.34 | -2.40 | 55.44 | -2.69 | -3.12 | 0.80 |
| T17 | 136 | 52.17 | -2.05 | -3.84 | 52.13 | -2.57 | -2.64 | 1.31 |
| T18 | 144 | 48.79 | -2.80 | -2.87 | 48.94 | -2.66 | -3.42 | 0.59 |
| T19 | 152 | 45.72 | -3.26 | -3.01 | 45.73 | -2.49 | -2.91 | 0.78 |
| T20 | 160 | 42.67 | -2.19 | -2.95 | 42.89 | -2.99 | -2.59 | 0.91 |
| T21 | 168 | 40.07 | -2.72 | -2.17 | 39.90 | -2.31 | -2.66 | 0.66 |
| T22 | 176 | 37.13 | -2.43 | -2.37 | 37.17 | -2.55 | -2.52 | 0.20 |
| T23 | 184 | 34.27 | -2.39 | -2.87 | 34.39 | -2.38 | -2.56 | 0.34 |
| T24 | 192 | 31.65 | -2.34 | -2.74 | 32.02 | -2.48 | -2.65 | 0.41 |
| T25 | 200 | 29.76 | -2.57 | -2.43 | 29.89 | -2.30 | -2.19 | 0.39 |
| T26 | 208 | 28.13 | -2.26 | -1.64 | 27.91 | -2.96 | -1.82 | 0.76 |
| T27 | 216 | 26.05 | -3.34 | -1.21 | 26.65 | -2.41 | -0.59 | 1.27 |
| T28 | 224 | 25.18 | -2.55 | 0.45 | 24.78 | -3.16 | 0.76 | 0.79 |
| T29 | 232 | 23.52 | -2.98 | 2.74 | 23.94 | -2.32 | 1.98 | 1.09 |
| T30 | 240 | 22.71 | -2.09 | 3.50 | 22.60 | -2.49 | 3.77 | 0.49 |
| T31 | 248 | 21.69 | -2.00 | 4.79 | 22.19 | -2.18 | 5.87 | 1.20 |
| T32 | 255 | 21.73 | -2.26 | 7.94 | | | | |

FIG.21

| INPUT GRADATION VALUE | CYAN OUTPUT GRADATION VALUE |
|---|---|
| 0 | 0 |
| 8 | 9 |
| 16 | 16 |
| 24 | 22 |
| 32 | 25 |
| 40 | 34 |
| 48 | 38 |
| 56 | 46 |
| 64 | 61 |
| 72 | 69 |
| 80 | 78 |
| 88 | 88 |
| 96 | 97 |
| 104 | 105 |
| 112 | 115 |
| 120 | 125 |
| 128 | 133 |
| 136 | 142 |
| 144 | 153 |
| 152 | 159 |
| 160 | 165 |
| 168 | 174 |
| 176 | 183 |
| 184 | 194 |
| 192 | 204 |
| 200 | 211 |
| 208 | 217 |
| 216 | 226 |
| 224 | 226 |
| 232 | 233 |
| 240 | 233 |
| 248 | 240 |
| 255 | 255 |

IMAGE PROCESSING APPARATUS, IMAGE PROCESSING METHOD, PROGRAM, AND RECORDING MEDIUM

CROSS-REFERENCE TO RELATED APPLICATIONS

The present application claims priority to and incorporates by reference the entire contents of Japanese Patent Application No. 2012-001263 filed in Japan on Jan. 6, 2012 and Japanese Patent Application No. 2012-034072 filed in Japan on Feb. 20, 2012.

BACKGROUND OF THE INVENTION

1. Field of the Invention

The present invention relates to an image processing apparatus, an image processing method, a program, and a recording medium for correcting the gradation.

2. Description of the Related Art

In order to derive a γ conversion table (gradation correction curve) of each of the single colors C, M, and Y, there has been an art for creating the γ conversion table in which the image data of variable gradation values for each single color is transmitted to an output device and outputted therefrom, respectively, and a density of the output result is measured, so that a desired density can be obtained correspondingly to the image data.

For example, in Japanese Laid-open Patent Publication No. 2010-263345, after a gradation correction parameter is derived to adjust a single color to a target color, the gradation correction parameter is corrected when the difference between the measured color data of the mixed color and the target color exceeds a tolerance range and, when a gradation change rate is not included in a predetermined tolerance range, the correction rate of the gradation correction parameter is reduced so as not to cause a sudden change in the gradation or an inversion of the gradation due to the correction.

In the above described conventional arts, however, although the gradation correction table is created so that adjustment to the target characteristics is made, there is a problem of the occurrence of a gradation collapse due to the sudden change in the gradation at a local gradation range.

There is needed to provide an image processing apparatus, an image processing method, a program, and a recording medium that suppresses the gradation collapse due to the sudden change in the gradation.

SUMMARY OF THE INVENTION

It is an object of the present invention to at least partially solve the problems in the conventional technology.

An image processing apparatus comprising: an image forming unit configured to output, on a predetermined medium, a chart including a plurality of gradation values for each of a plurality of color materials; a color measuring unit configured to measure the output chart; a creation unit configured to determine a target color based on the measurement result and create a gradation correction table so as to obtain the target color for each gradation of each color; and a processing unit configured to convert an input gradation value of image data into an output gradation value in the image forming unit with referring to the created gradation correction table.

In the image processing apparatus, after creating the gradation correction table, the creation unit changes the gradation correction table such that a measured color value difference of neighboring gradations of the same color material is included in a predefined tolerance range or such that an amount in change of a measured color value difference of the neighboring gradations is included in a predefined tolerance range.

An image processing method comprising: an image forming step of outputting, on a predetermined medium, a chart including a plurality of gradation values for each of a plurality of color materials; a color measuring step of measuring the outputted chart; a creation step of determining a target color based on the measurement result and creating a gradation correction table so as to obtain the target color for each gradation of each color; and a processing step of referring to the created gradation correction table to convert an input gradation value of image data into an output gradation value in the image forming step.

In the image processing method, after creating the gradation correction table, the creation step changes the gradation correction table such that a measured color value difference of neighboring gradations of the same color material is included in a predefined tolerance range or such that an amount in change of a measured color value difference of the neighboring gradations is included in a predefined tolerance range.

An image processing apparatus comprising: an image forming unit configured to output, on a predetermined medium, a chart including a plurality of gradation values for each of a plurality of color materials; a color measuring unit configured to measure the outputted chart; a creation unit configured to determine a target color based on the measurement result and create a gradation correction table so as to obtain the target color for each gradation of each color; and a processing unit configured to convert an input gradation value of image data into an output gradation value in the image forming unit with referring to the created gradation correction table.

In the image processing apparatus, the creation unit creates a gradation correction table for each single color such that a measured color value for each gradation of a mixed color is included in a predetermined range as a first condition, and an output gradation value to an input gradation value of a gradation correction table for the each single color is included in a predetermined range as a second condition.

In addition, the present application relates a program for causing a computer to execute: an image forming step of outputting, on a predetermined medium, a chart including a plurality of gradation values for each of a plurality of color materials; a color measuring step of measuring the outputted chart; a creation step of determining a target color based on the measurement result, creating a gradation correction table so as to obtain the target color for each gradation of each color, and, after creating the gradation correction table, changing the gradation correction table such that a measured color value difference of neighboring gradations of the same color material is included in a predefined tolerance range or such that an amount in change of a measured color value difference of the neighboring gradations is included in a predefined tolerance range; and a processing step of referring to the created gradation correction table to convert an input gradation value of image data into an output gradation value in the image forming step.

Also, the present application relates to a computer readable recording medium in which the program mentioned above is recoded.

Also, the present application relates to an image processing method comprising: an image forming step of outputting, on a predetermined medium, a chart including a plurality of gradation values for each of a plurality of color materials; a color measuring step of measuring the outputted chart; a creation step of determining a target color based on the measurement result and creating a gradation correction table so as to obtain the target color for each gradation of each color; and a processing step of referring to the created gradation correction table to convert an input gradation value of image data into an output gradation value in the image forming step, wherein the creation step creates a gradation correction table for each single color such that a measured color value for each gradation of a mixed color is included in a predetermined range as a first condition, and an output gradation value to an input gradation value of a gradation correction table for the each single color is included in a predetermined range as a second condition.

Also, the present application relates to a program for causing a computer to execute: an image forming step of outputting, on a predetermined medium, a chart including a plurality of gradation values for each of a plurality of color materials; a color measuring step of measuring the outputted chart; a creation step of determining a target color based on the measurement result and, when obtaining the target color for each gradation of each color, creating a gradation correction table for each single color such that a measured color value for each gradation of a mixed color is included in a predetermined range as a first condition, and an output gradation value to an input gradation value of a gradation correction table for the each single color is included in a predetermined range as a second condition; and a processing step of referring to the created gradation correction table to convert an input gradation value of image data into an output gradation value in the image forming step.

Also, the present application relates to a computer readable recording medium in which the program mentioned above is recoded.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a chart illustrating an example of a color measurement result for black;

FIG. 6 is a chart illustrating target colors (black) on a gradation value basis;

FIG. 9 is a chart illustrating an example of a color measurement result for gray;

FIG. 10 is a chart illustrating target colors (gray) on a gradation value basis;

FIG. 11 is a chart illustrating a gradation correction table for black;

FIG. 13 is a chart illustrating an example of a tolerance range of the color difference between neighboring gradations for gray;

FIG. 18 is a chart illustrating an example of a color measurement result for cyan;

FIG. 19 is a chart illustrating measured color values on a gradation value basis derived by linear-interpolating the color measurement result of FIG. 18;

FIG. 20 is a chart illustrating a method for calculation of the range in which the measured color value for gray is supposed to exist;

FIG. 21 is a chart illustrating an example of the latest gradation correction table for cyan.

DETAILED DESCRIPTION OF THE PREFERRED EMBODIMENTS

Figure 1:
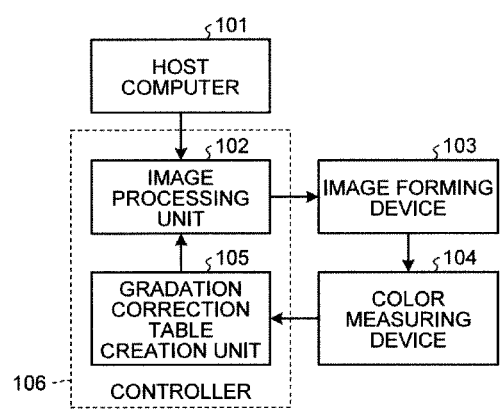
FIG. 1 is a block diagram illustrating an example of the configuration of an image processing system according the embodiment.

One embodiment of the present invention will be described below in detail by referring to the drawings
First Embodiment In the process for creating a gradation correction table, the first embodiment is to provide a tolerance range for a color difference of neighboring gradations in which the same color material is used and create the gradation correction table to be included in the tolerance range, or provide a tolerance range for an amount in change of the color difference of the neighboring gradations in which the same color material is used and change the gradation correction table so as to be included in the tolerance range. The descriptions will be provided below with specific examples.

FIG. 1 illustrates an example of the configuration of an image processing system according to the embodiment. In FIG. 1, 101 represents a host computer, 102 represents an image processing unit, 103 represents an image forming device, 104 represents a color measuring device, 105 represents a gradation correction table creation unit, and 106 represents a controller. The controller 106 includes the image processing unit 102 and the gradation correction table creation unit 105 and performs a printing process, a gradation correction table creation process, and so on.

In response that a printing process is instructed from an application running on the host computer 101, the host computer 101 causes a not-illustrated printer driver to operate to transmit image information to be printed to the controller 106. The controller 106 causes the image processing unit 102 to operate to make an imaging process, which will be described later, to the inputted image information and convert it into print output data, and outputs it to the image forming device 103.

The image forming device 103 is an output device for printing the image data, which may be, for example, an image forming device such as a color printer or a color facsimile of the electronic photographing system or the inkjet system.

On the other hand, in response that an execution of a gradation correction table creation process is instructed from the host computer 101, the controller 106 creates a gradation correction table to update the gradation correction table.

Figure 2:
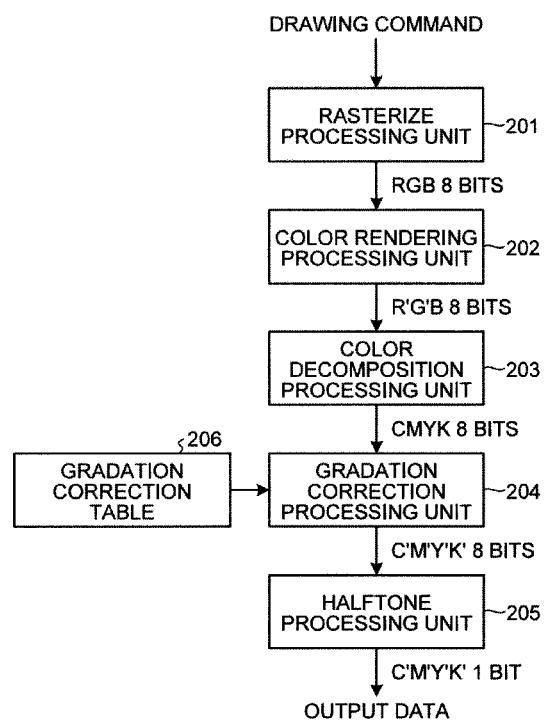
FIG. 2 is a block diagram illustrating the configuration of the image processing unit of FIG. 1.

FIG. 2 illustrates a configuration of the image processing unit 102 of the present invention, which converts the image information to be printed into the print output data. The image information transmitted from the application is the data in a form of the drawing command represented with the RGB color signals for the usual display. Therefore, a rasterize processing unit 201 interprets the drawing command to expand it to the bitmap data of eight bits for each of the R, G, B colors. Next, since the color reproduction range and/or the color reproduction characteristics are significantly different between the display and the printer, a color rendering processing unit 202 uses a profile associated with the display and/or the printer to convert the RGB data of the bitmap image into the R'G'B' data with the color range that is compressed so as to match the color reproduction range of the printer.

The general image forming device 103 uses inks of four colors of C (cyan), M (magenta), Y (yellow), and K (black), or more colors to form the image. Then, a color decomposition processing unit 203 converts the R'G'B' data into the color data suitable for the printer output. For example, when using four colors of C, M, Y, and K, the image forming device 103 is able to convert the R'G'B' data into CMYK four-color data by performing a color decomposition process such as the OCR, the UCA, and the like.

Next, a gradation correction processing unit 204 refers to a gradation correction table 206 to make a gradation conversion of the data value for each color of C, M, Y, and K. In the present embodiment, a one-dimensional lookup table has been defined as the gradation correction table 206. The fluctuation and/or the individual variation of the density characteristics of the image forming device 103 are absorbed by changing the gradation correction table 206.

A halftone (intermediate gradation) processing unit 205 receives the image data of eight bits for each of the gradation correction processed colors C', M', Y', and K' and performs a conversion process into the CMYK image data of the smaller number of bits that the image forming device 103 is able to output. The above imaging process allows for creation of the CMYK image data that the image forming device 103 is able to output.

Figure 3:
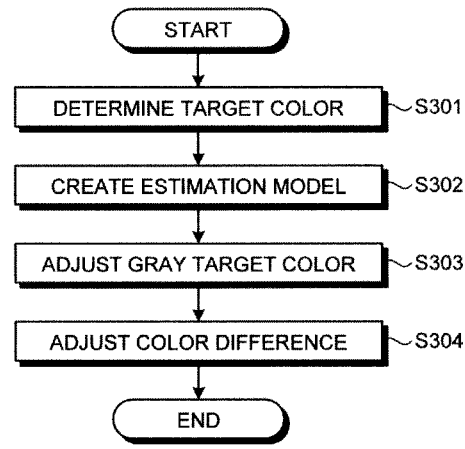
FIG. 3 is a flowchart illustrating a process of the gradation correction table creation unit according to a first embodiment.

FIG. 3 illustrates a process flowchart at the gradation correction table creation unit 105. The concept of a method for creating the gradation correction table will be described by using FIG. 3. Hereafter, the gradation value, that is, the image data is represented by an integer from 0 to 255, and the greater value represents the higher density. In addition, the mixed color having the equal gradation values for cyan, magenta, and yellow whose gradations have not been corrected is referred to as gray.

The gradation correction table creation unit 105 outputs the pre-stored chart data to the image forming device 103 via the image processing unit 102 so as not to cause the gradation correction table 206 to operate, that is, the gradation correction processing unit 204 is in a through state. The image forming device 103 prints the chart on the print paper, the color measuring device 104 measures the color of the printed chart, and then the target color is determined from the color measurement result (step S301).

Next, the gradation correction table creation unit 105 creates a gray reproduction estimation model function according to the color measurement result of the printed chart (step S302). Next, the gradation correction table creation unit 105 determines the gradation correction table such that the gray for each gradation is adequately close to the target color (step S303), and the gradation correction table creation unit 105 determines the gradation correction table such that the color difference of the neighboring gradations is included in a predetermined range (step S304).

Figure 6:
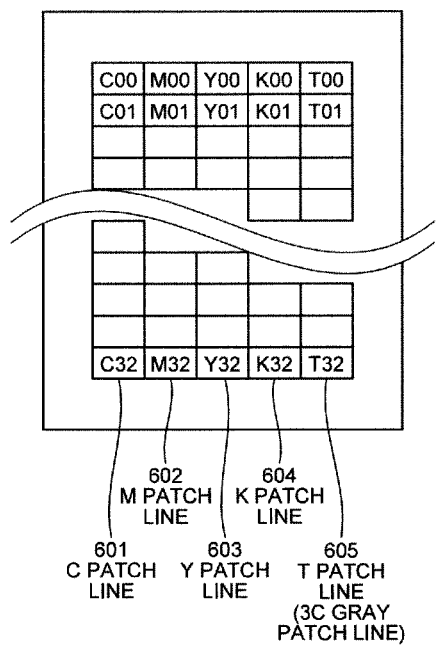
FIG. 6 is a view illustrating a chart that an image forming device outputs for a gradation correction table creation.

FIG. 6 illustrates the chart that the image forming device 103 outputs for the creation of the gradation correction table. The chart illustrated in FIG. 6 has a C patch line 601 arranged with the patches drawn with single cyan colors from C00 to C32. The gradation value of cyan increases by eight such that C00 represents gradation value 0 of cyan, C01 represents gradation value 8 of cyan, C02 represents gradation value 16 of cyan, C31 is thus the printed image data of gradation value 248, and C32 is the printed image data of gradation value 255. Here, the gradation value of the color which is not indicated for each patch is 0. For example, as for C01, the gradation value of cyan is 8, the gradation values of magenta, yellow, and black are all 0.

The above chart similarly has an M patch line 602 arranged with the patches drawn with single magenta colors from M00 to M32, a Y patch line 603 arranged with the patches drawn with single yellow colors from Y00 to Y32, and a K patch line 604 arranged with the patches drawn with single black colors from K00 to K32.

Further, there is a T patch line 605 from T00 to T32 that is arranged with the patches drawn with the mixed color having the same gradation values for cyan, magenta, and yellow, that is, the gray. T01 represents the printed image data in which the gradation values for cyan, magenta, and yellow are all 8, T02 represents the printed image data in which the gradation values for cyan, magenta, and yellow are all 16, and T32 represents the printed image data in which the gradation values for cyan, magenta, and yellow are all 255. It is noted that, using this gradation value, T01 is referred to as the gray for gradation value 8, for example.

Details of Step S301

The processing in step S301 will be described. First, a target color is determined for a single color of black. According to the measured color results for K00 and K32 of the printed chart of FIG. 6, the former is set to the target value of gradation value 0 and the latter is set to the target value of gradation value 255 and, for the gradation value between these values, a linear-interpolated value is set as the target value.

Here, the L* component only out of the measured color values L*, a*, and b* is provided as the target color for the single color of black, and thus a* component or b* component is not provided. FIG. 7 illustrates an example of the color measurement result of the black. As illustrated in FIG. 7, when the L* component of K00 obtained by the color measurement is 95.1 and the L* component of K32 obtained by the color measurement is 16.5, the target color for gradation value 0 is L*=95.1 and the target color for gradation value 255 is L*=16.5, and the target color for gradation value 48 is derived as below by the linear interpolation:

$$L^* = 95.1 + (16.5 - 95.1) \div (255 - 0) \times 48 = 80.3$$

The target color (black) for each gradation value illustrated in FIG. 8 is obtained by similarly performing the process for each gradation.

Next, a target color is determined for gray. The L* component of the target color of the gray is the L* of the target color for the single color of black of the same gradation value. The a* and b* components of the target color of the gray are all −2.5. However, the a* and b* components are adjusted so as to be close to the a* and b* of K0 or T0 as approaching to gradation value 0 at a lower gradation value, that is, equal to or less than gradation value 96 in this case. Further, the L*, a*, and b* components are adjusted so as to be close to the L*, a*, and b* of T32 as approaching to gradation value 255 at a higher gradation value, that is, equal to or greater than gradation value 192 in this case.

FIG. 9 illustrates an example of the color measurement result of the gray. As illustrated in FIG. 9, when the color measurement value of T00 that is the gray for gradation value 0 is (a*, b*)=(0.4, −3.4), then the target color for gradation value 0 is (a*, b*)=(0.4, −3.4), the target color for gradation value 96 is (a*, b*)=(−2.5, −2.5), and the a* and b* components of the target value between these values are derived by the linear interpolation.

For example, as for gradation value 48, the followings are derived:

$$a^* = 0.4 + (-2.5 - 0.4) \div (96 - 0) \times 48 = -1.1$$

$$b^* = -3.4 + (-2.5 - (-3.4)) \div (96 - 0) \times 48 = -3.0$$

Further, as illustrated in FIG. 9, when the color measurement value of T32 that is the gray for gradation value 255 is (a*, b*)=(−2.3, 7.4), then the target color for gradation value 255 is (a*, b*)=(−2.3, 7.4), the target color for gradation value 192 is (a*, b*)=(−2.5, −2.5), and the a* and b* components of the target colors from gradation value 192 to gradation value 255 are derived by applying the quadratic functions in which the inclination are zero at gradation value 192, respectively.

On the other hand, for the L* component of the target values from gradation value 192 to gradation value 255, when the target color of the black for gradation value 192 is L*=35.9 according to FIG. 8 and the measured color value of T32 that is the gray for gradation value 255 is L*=21.4 according to FIG. 9, the target value of L* from gradation value 192 to gradation value 255 is derived by the linear interpolation of these values. The target color of the gray for each gradation value illustrated in FIG. 10 is obtained by acquiring the target color for each gradation. Here, the L* component of the target color for the gray may be derived so as to be linear based on the color measurement result of T00 and T32 in the chart of FIG. 6 independently of the target color for the single color of black and similarly to the single color of black.

Details of Step S302

The processing in step S302 will be described. According to the color measurement result in the chart of FIG. 6 printed at step S301, the gray reproduction estimation model function is created so that the error is minimized. For example, the estimation model function is expressed as Expression 1.

$$L^* = Fl(Cg[i], Mg[j], Yg[k]) + L\_paper$$

$$a^* = Fa(Cg[i], Mg[j], Yg[k]) + a\_paper$$

$$b^* = Fb(Cg[i], Mg[j], Yg[k]) + b\_paper \quad \text{Expression 1}$$

Expression 1 is to estimate the color expressed by the mixed color of cyan, magenta, and yellow of gradation values i, j, and k that have been gradation-corrected, respectively. Here, L_paper, a_paper, and b_paper represent the measured color values (L*, a*, b*) of the paper, and Cg[i], Mg[j], Yg[k] represent the color differences to the white on the paper of cyan, magenta, and yellow whose gradation values after the gradation correction are i, j, and k, respectively.

Fl( ), Fa( ), and Fb( ) are the estimation model function, such as a linear function, a high dimension polynomial, or a function expressed by the neural network. The creation of the reproduction estimation model function means the determination of the coefficient of the function. It is noted that, although the estimation model function is described in which the parameters Cg[i] and the like means the color difference to the white on the paper of each single color, it may be a estimation model function in which the parameters Cg[i] and the like means the density of each single color or the gradation value itself of the single color.

Details of Step S303

The processing of step S303 will be described using FIG. 4. The gradation values for cyan, magenta, and yellow by which the gray of each gradation is set to the target color are calculated using the gray estimation model function created at step S302 for the gray of gradation values 0, 8, 16, . . . , 248, and 255 that are the gradation values corresponding to T00 to T32. That is, the gradation values of cyan, magenta, and yellow whose values of L*, a*, and b* of Expression 1 are adequately close to the target colors are searched by the repeated calculation to have the gradation correction tables for cyan, magenta, and yellow.

The gradation value for black that is the target color is searched to have the gradation correction table for black according to the relationship between the black gradation value and L* component derived from the color measurement result in the chart of FIG. 6 printed at step S301 for the single color of black for gradation values 0, 8, 16, . . . , 248, and 255 that are the gradation values corresponding to K00 to K32.

Here, the output gradation value corresponding to input gradation value 96 is calculated in the gradation correction table for black as an example. By referring to FIG. 8, the target color of gradation value 48 is L*=80.3. Then, according to the color measurement result in FIG. 7, the gradation value for obtaining L*=80.3 is estimated by the linear interpolation. According to FIG. 7, it is L*=81.8 for gradation value 40 and L*=79.7 for gradation value 48 when the measured color value close to L*=80.3 is obtained. Therefore, it can be seen that the gradation value for obtaining L*=80.3 is 40+(80.3−81.8)÷(79.7−81.8)×(48−40)=45.7. The gradation correction table for converting the input gradation value to the output gradation value of black illustrated in FIG. 11 is obtained by performing the similar process for each gradation (step S401).

Next, the gradation correction processing unit 204 utilizes the gradation correction table created at step S401, the image forming device 103 prints(outputs) the chart on the print paper, and the color measuring device 104 measures the color of the printed chart (step S402).

The color difference between the target color and the color measurement result is calculated for each color of the gray and black, and the sum of the color differences for all the gradation values is calculated. If the step of creating the gradation correction table of step S401 is the first time, or if, on or after the second time and the sum of the color differences for a predetermined gradation range is smaller than the previous value, the gradation correction table is again created. Otherwise, it is determined that the further adjustment into the target color will be difficult and it is determined to employ the gradation correction table whose sum of the color differences within the predetermined gradation range is the smallest that has been created at the time one before the final time. Further, if the predetermined upper limit of the number of times is reached, it is determined to employ the gradation correction table which has been taken at the time when the sum of the color differences within the predetermined gradation range is the smallest.

Figure 12:
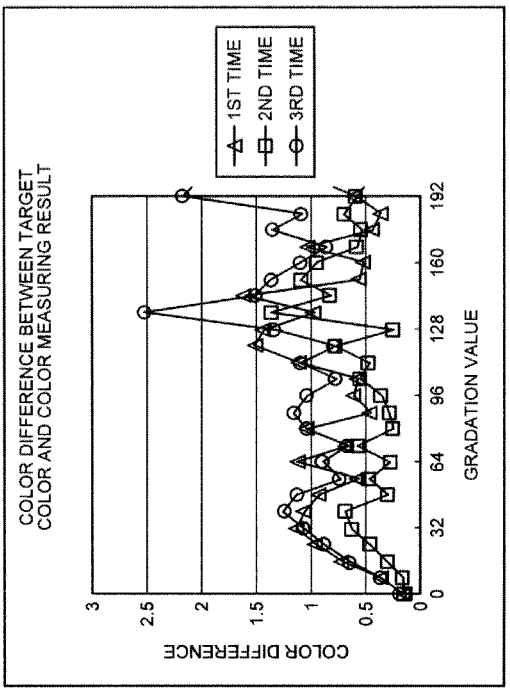
FIG. 12 is a chart and a graph illustrating a color difference (gray) between a target value and a color measuring result.

FIG. 12 illustrates an example of the color difference when the predetermined range in the gray is divided into the gradation values 0 to 192 in a pitch of eight gradation values. When the sum of the color differences is 20.6 at the first time and is 13.5 at the second time, the gradation correction table is again created. If the resultant sum of the color differences at the third time is 26.9, step S303 ends and the gradation correction table at the second time is employed. After the gradation correction tables of the gray and black are determined, step S303 ends (step S403).

At step S401 on or after the second time, the gradation value for each single color for obtaining the corrected target value is searched to have the gradation correction table based on the difference between the target color and the color measurement result. For example, when the target value of the gray for gradation value 48 is (L*, a*, b*)=(80.3, −1.1, −3.0) and the color measurement result of T06 that is the gray for gradation value 48 is (L*, a*, b*)=(81.0, −1.6, −3.6), then the gradation values for cyan, magenta, and yellow are searched by setting (L*, a*, b*)=(79.6, −0.6, −2.4), in which the difference is taken into account, as the target color of the gray for gradation value 48. This is because, while the gradation value for which L* is 80.3 is derived, the actual measurement is 81.0, and it is therefore determined that the gray estimation model function has the error of +0.7 and the gradation value for which L* is 79.6 should be derived in order to have L*=80.3.

Details of Step S304

Figure 5:
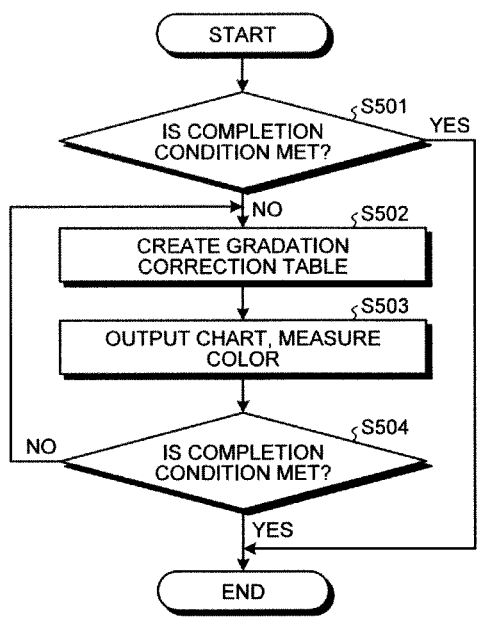
FIG. 5 is a flowchart illustrating a detailed process of step S304 of FIG. 3.

The processing of step S304 will be described using FIG. 5. The color difference of the neighboring gradations is calculated according to the measurement result of the chart illustrated in FIG. 6 that the image forming device 103 outputs using the gradation correction table determined at step S303. Here, the color difference of the neighboring gradations refers to, for example, the color difference of the patches having eight or seven gradation values spaced apart from each other in the same patch line such as T10 and T11 or K13 and K14, for example. If the color differences of all the neighboring gradations of gray and the color differences of all the neighboring gradations of black are included in a predetermined tolerance range or if step S304 has been repeated for the upper limit of times, step S304 ends, otherwise, step S502 is entered (step S501).

FIG. 13 illustrates an example of the tolerance range of the color differences of the neighboring gradations of the gray. Here, the tolerance range is defined by deriving the color difference of the neighboring gradations for the target color of the gray illustrated in FIG. 10 and providing the width of ±1.5 with respect to the value. For example, the color difference of the neighboring gradations in T24 for gradation value 192 is determined from the color difference of the target colors of T24 and T23 for gradation value 184.

From FIG. 10, the target color of T23 is (L*, a*, b*)=(38.4, −2.5, −2.5) and the target color of T24 is (L*, a*, b*)=(35.9, −2.5, −2.5) and therefore the color difference is ΔE94=2.5, so that the tolerance range is assumed to be 1.0 to 4.0. It is noted that color difference ΔE94 derived by correcting the color difference ΔEab is used here.

Figure 14:
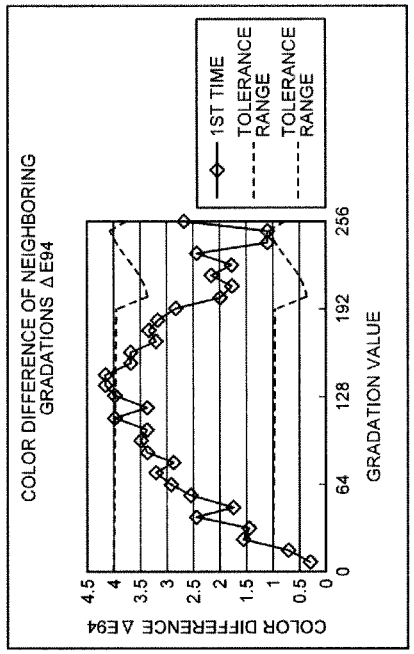
FIG. 14 is a chart and a graph illustrating an example of a color difference between a measured color value and a neighboring gradation for gray.

FIG. 14 illustrates an example of the color difference between the measured color value of the gray and the neighboring gradations. FIG. 14 illustrates that the color difference for gradation values 0 and 8, the color difference for gradation values 8 and 16, the color difference for gradation values 120 and 128, the color difference for gradation values 128 and 136, and the color difference for gradation values 136 and 144 are out of the tolerance range.

It is noted that, although, as for the tolerance range, it is desirable to provide the color which does not cause discomfort to the human's eye and/or the value which is independent for each gradation value, the tolerance range may be the same value for the same gradation value of the gray and black or the same value for the same color regardless of the gradation value. Further, for the gray, a part of or all of the L* component, the a* component, the b* component, and the color difference may be used for determination. Further, for the black, instead of the color difference, the lightness difference or the density difference may be used for determination.

Next, the gradation correction table for the gradation value that is not included in the tolerance range is changed (step S502). In the example of FIG. 14, the color differences between the gradation values 120 to 144 in a pitch of eight gradation values are out of the tolerance range. The target colors for gradation values 120 to 144 are defined by interpolating the measured color values for gradation values 112 and 152 including gradation values 120 and 144 therebetween and the gradation correction table is changed so as to obtain the target colors.

Further, although the color differences between the gradation values 0 to 16 in a pitch of eight gradation values may be out of the tolerance range, the gradation correction table is not changed for the end of the gradation value such as gradation value 0. For this gradation range, the target colors for gradation values 8 to 16 are defined by interpolating the measured color values for gradation value 0 and gradation value 24, and the gradation correction table is changed so as to obtain the target colors. From FIG. 14, the measured color value for gradation value 112 is (L*, a*, b*)=(62.6, −2.3, −2.5) and the measured color value for gradation value 152 is (L*, a*, b*)=(44.0, −3.3, −3.0), and therefore these are linear-interpolated to derive the target value for gradation value 120 as (L*, a*, b*)=(58.8, −2.5, −2.6).

It is noted that, the gradation value that has once been included in the predetermined tolerance range at step S501 or step S504 is not changed during the following step S304. Therefore, the number of gradation values to be changed does not increase.

Next, the gradation correction processing unit 204 utilizes the gradation correction table created at step S502, the image forming device 103 prints(outputs) the chart on the print paper, and the color measuring device 104 measures the printed chart (step S503).

The color difference between the neighboring gradations is calculated according to the measurement result of the chart illustrated in FIG. 6 outputted using the latest gradation correction table. If the color differences of all the neighboring gradations of the gray and the color differences of all the neighboring gradations of the black are included in the predetermined range, step S304 ends, otherwise, step S502 is again performed (step S504).

It is noted that the image processing system based on the present embodiment is not limited to this configuration and, after performing step S304 for the color difference adjustment for single colors of the gray and black, the color difference adjustment for single colors of cyan, magenta, and yellow may be performed. Further, the gradation correction table may be determined so that, instead of the color difference between the neighboring gradations, the change in the amount of the color differences between the neighboring gradations, for example, the difference between the color difference of T10 and T11 and the color difference of T11 and T12 is included in a predetermined range.

As described above, in the present embodiment, the quality can be increased by creating the gradation correction table for the condition of the gray to which the human's eye is sensitive. Further, after the gradation correction table is created so as to obtain the target color for each gradation of each color, the gradation correction table is changed such that the difference in the measured color value for the neighboring gradations of the same color material is included in the predetermined tolerance range or such that the amount of change in the measured color value differences for the neighboring gradations is included in the predetermined tolerance range, so that the target color can be matched to the utmost and the sudden difference in the gradation can be suppressed. Furthermore, the use of color difference close to the sense of the human's eye allows for the accurate determination of the gradation difference, and the use of the difference in color component, the difference in lightness, or the difference in density, which can be easily calculated, allows for the process with less load.

Second Embodiment

In the second embodiment, the gradation correction table for each single color is determined based on both the color measurement result of the mixed color (gray) and the tolerance change range for each single color. Further, it is determined to suppress the gradation collapse of the mixed color based on the color measurement result of the mixed color (gray). The tolerance change range for each single color is predefined to suppress the gradation collapse of the single color. Below, descriptions will be made by providing a specific example. It is noted that the configuration of the image processing apparatus in the second embodiment is the same as in FIG. 1 and FIG. 2 and thus the description thereof will be omitted here.

In this embodiment, in the process for creating a gradation correction table, a range in which a measured color value for a particular gradation in a single color is supposed to exist is determined based on measured color values for neighboring gradations, then a tolerance range for a change of the gradation correction table corresponding to the particular gradation is determined according to the range in which the measured color value is supposed to exist, and the gradation correction table for each single color is determined based on the tolerance range for a change of each single color and the color measurement result of the mixed color.

Figure 15:
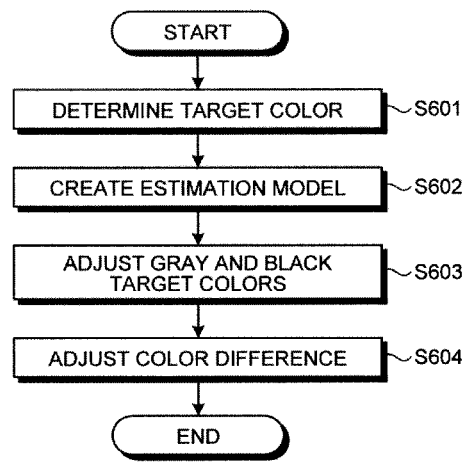
FIG. 15 is a process flowchart of a gradation correction table creation unit according to a second embodiment.

FIG. 15 is a flowchart illustrating an example of the process of the gradation correction table creation unit 105 according to the second embodiment. Hereafter, similarly to the above, the gradation value, that is, the image data is represented by an integer from 0 to 255 and the greater value represents the higher density. Further, the mixed color having the equal gradation values for cyan, magenta, and yellow before the gradation correction is referred to as gray.

The gradation correction table creation unit 105 outputs the pre-stored chart data to the image forming device 103 via the image processing unit 102 so as not to cause the gradation correction table 206 to operate, that is, the gradation correction processing unit 204 is in a through state, the image forming device 103 prints the chart on the print paper, the color measuring device 104 measures the color of the printed chart, and then the target color is determined from the color measurement result (step S601).

It is noted that the chart that the image forming device 103 outputs for the creation of the gradation correction table is the same as in FIG. 6 as described above. Also, the color measurement result of the gray is the same as in FIG. 9. Also, the target value of the gray for each gradation value is the same as in FIG. 10 as described above. Also, the gradation correction table for converting the input gradation value of black into the output gradation value is the same as in FIG. 11 as described above.

Next, the gradation correction table creation unit 105 creates a gray reproduction estimation model function from the color measurement result of the printed chart (step S602).

Next, the gradation correction table creation unit 105 determines the gradation correction table such that the gray for each gradation is adequately close to the target color (step S603).

Next, the gradation correction table creation unit 105 determines the gradation correction table such that the color measurement value for each gradation of the gray is included in a predetermined range defined according to the color measurement values for the neighboring gradations of the same color as the each color and such that the output gradation value to the input gradation value for the gradation correction table of each single color is included in a predetermined range (step S604).

The details of step S601 is the same as step S301 in the first embodiment as described above, and thus the repeated descriptions will be omitted.

Details of Step S602

The details of step S602 is the same as step S302 in the first embodiment as described above, and thus the repeated descriptions will be omitted and the different process will be described.

From on the color measurement result of the chart of FIG. 6 printed at step S601, the gray reproduction estimation model function is created so that the error is reduced. For example, the estimation model function is expressed as Expression 1 as described above.

Here, the color difference dE(p,q) of the color p and the color q is expressed as following Formula 1.

$$\sqrt{(L(p)-L(q))^2+(a(p)-a(q))^2+(b(p)-b(q))^2} \quad (1)$$

It is noted that L(c), a(c), and b(c) represent L*, a*, and b* of the color c, respectively.

Details of Step S603

Figure 4:
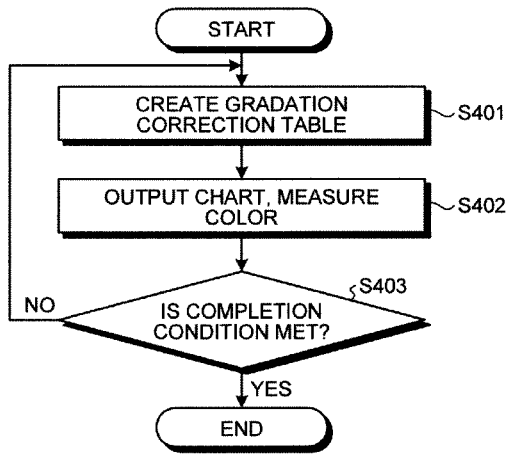
FIG. 4 is a flowchart illustrating a detailed process of step S303 of FIG. 3 and step S603 of FIG. 15.

The details of step S603 is similar to step S303 in the first embodiment and the operation based on the flowchart of FIG. 4 as described above. However, an example of the color difference between the target value and the color measurement result is illustrated in FIG. 17.

Figure 17:
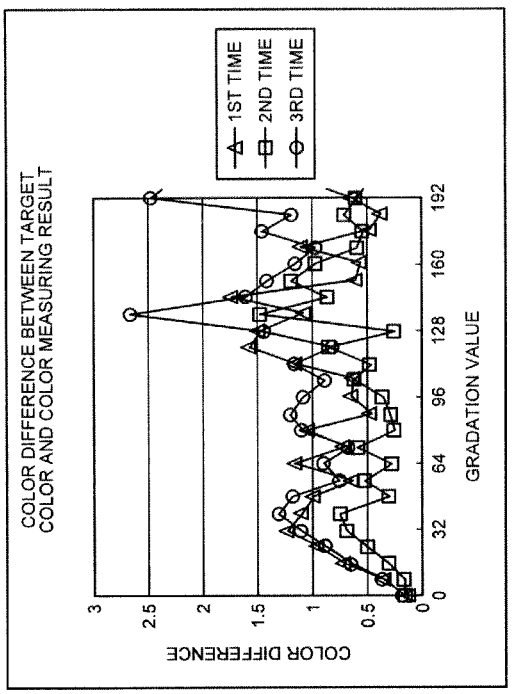
FIG. 17 is a chart and a graph illustrating an example of color difference between a target color and a color measurement result for gray.

FIG. 17 illustrates an example of the color difference when the predetermined range in the gray is divided into gradation values 0 to 192 in a pitch of eight gradation values. When the sum of the color differences is 20.6 at the first time and is 13.5 at the second time, the gradation correction table is again created. If the resultant sum of the color differences at the third time is 26.9, step S603 ends and the gradation correction table at the second time is employed. After the gradation correction tables of the gray and black are determined, step S603 ends (at the time of process of step S403 in FIG. 4).

Details of Step S604

Figure 16:
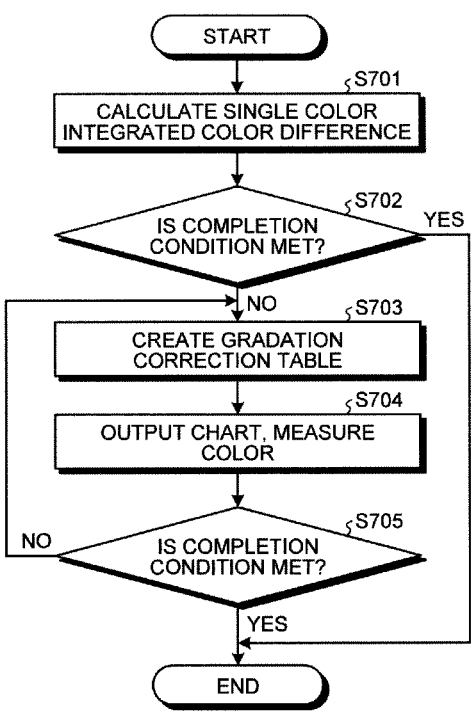
FIG. 16 is a flowchart illustrating a detailed process of step S604 of FIG. 15.

Next, the processing of step S604 will be described using FIG. 16. The gradation characteristics that is the relationship between the gradation value for each single color and the color measurement value is identified based on the measurement result of the chart illustrated in FIG. 6 outputted from the gradation correction processing unit 204 in the through state.

Here, the gradation characteristics is expressed by the integrated color difference from gradation value 0 that is the white on the paper, and the integrated color difference for gradation value n is expressed as following Formula 2. It is noted that the gradation characteristics may be expressed by the integrated color difference from the maximum density.

$$\sum_{k=1}^{n} dE(k-1, k) \quad (2)$$

Here, dE(a, b) represents the color difference between gradation values a and b. It is noted that the integrated color difference for gradation value 0 is 0.

Expressing the gradation characteristics by the integrated color difference allows the degree of the gradation change to be expressed in a scale close to the human sense characteristics. Further, the gradation value and the characteristics value (here, the integrated color difference) can be expressed by one component, respectively (When the gradation characteristics is expressed by L*, a*, and b*, the characteristics value requires three components of L*, a*, and b*. Although one component may be enough by expressing the density for a single color, the difference in perception to density 0.1 will be different according to the density range).

By using FIG. 18 and FIG. 19, the method for calculating the integrated color difference will be described. FIG. 18 is an example of the color measurement result of cyan. From this color measurement result of cyan, the measured color value in a pitch of one gradation value as illustrated in FIG. 19 is derived by a linear interpolation. For example, L* is 95.23 for gradation value 0 and L* is 94.63 for gradation value 8 in FIG. 18, and therefore the measured color value L* for gradation value 1 is
((94.63−95.23)×(1/(8−0)))+95.23≅95.16, that is, 95.16. Similarly, by calculating a* and b* and making calculations for other gradation values, the L*, a*, and b* for each gradation value illustrated in FIG. 19 are obtained.

Next, the color difference between the gradation values spaced apart to each other by one gradation value is derived for each gradation value. For example, the color difference between gradation value 0 and gradation value 1 is derived by Expression 1 as, ((95.23−95.16)^2+(0.41−0.34)^2+(−3.50+3.57)^2)^(½)≅0.12, that is, 0.12 ("^" refers to power).

Next, the integrated color difference into which the color differences from gradation value 0 are integrated is derived. For example, the integrated color difference of gradation value 3−gradation value 4 is 0.51 that is the sum of 0.12 that is the color difference of gradation value 0 and gradation value 1, 0.13 that is the color difference of gradation value 1 and gradation value 2, 0.12 that is the color difference of gradation value 2 and gradation value 3, and 0.14 that is the color difference of gradation value 3 and gradation value 4 (step S701).

Next, the range in which the measured color values for each gradation value of the black and gray are supposed to exist is calculated from the measurement result of the chart illustrated in FIG. 6 outputted using the latest gradation correction table. That is, in order to derive the gradation correction table that does not cause a local sudden change in the gradation, the value where the measured color value for the particular gradation is supposed to exist is determined based on the actual measured value for the neighboring gradation.

By using FIG. 20, described will be the method for calculating the range in which the measured color value of the gray is supposed to exist. FIG. 20 illustrates the measured color value for each gradation value of the gray according to the latest gradation correction table. For example, the range in which gray gradation value 8 of T01 is derived as follows.

First, the measured color value for gradation value 8 is derived from T00 and T02 interposing T01 by a linear interpolation. The L* component is
(92.29−95.19)×(8−0)÷(16−0)+95.19=93.74, that is, 93.74. Similarly, by calculating the a* and b* components, as illustrated in FIG. 20,
(L*, a*, b*)=(93.74, 0.11, −3.32)
is obtained.

That the measured color value for gradation value 8 becomes the value (93.74, 0.11, −3.32) is suitable to reproduce the continuous change in gradation. Taking into consideration of the error and/or the margin to recognize the gradation difference at the output device, however, it is assumed that the gradation difference may be tolerable if the color difference is within 0.8 from that value. That is, that the gray gradation value 8 is within the color difference of 0.8 from the value (range to exist) is defined as the first condition to complete step S604. It is noted that, as illustrated in FIG. 20, the actual measured value for gradation value 8 is
(L*, a*, b*)=(93.77, 0.24, −3.50),
and, since the color difference (the color difference between the actual measured value for gradation value 8 and the measured color value for gradation value 8 by the linear interpolation) is 0.22, the gray gradation value 8 satisfies the first condition.

If the measured color values of gray T01 to T31 and black K01 to K31 are included in the range to exist (the first condition) and if the output gradation values to the input gradation values of respective gradation correction tables for cyan, magenta, and yellow are included in a predetermined tolerance range described later (the second condition), step S604 ends, otherwise, step S503 is entered (step S702).

By using FIG. 21, described will be the second condition that each of the gradation correction tables for cyan, magenta, and yellow is required to satisfy. FIG. 21 is an example of the latest gradation correction table of cyan. The values in the gradation correction table corresponding to input gradation value 8 and input gradation value 24 are output gradation value 9 and output gradation value 22, respectively. On the other hand, according to FIG. 19, the integrated color difference for gradation values 9 and 22 when the gradation correction processing unit 204 makes output in the through state are 1.21 and 4.36, respectively.

That is, when the latest gradation correction table is used, the image data for input gradation values 8 and 24 of cyan are converted into output gradation values 9 and 22 by the image processing unit 102, respectively, and it is expected that the images whose integrated color differences are 1.21 and 4.36 are outputted from the image forming device 103. When the image data which changes evenly and continuously is inputted, it is desirable that the image whose gradation evenly changes be outputted. Therefore, the condition for completing step S304 is defined that, for the image data for gradation value 16 that is the center of cyan gradation values 8 and 24, the integrated color difference becomes the center of their values so that the integrated color difference changes evenly. However, taking into consideration of the error and/or the margin to recognize the gradation difference at the output device, the gradation collapse can be tolerable if the difference from the value is within 0.8.

The intermediate value of the integrated color differences is
(1.21+4.36)÷2≅2.79, that is, 2.79 and, taking into account of the tolerance range, the condition is defined that the integrated color difference for the output gradation value corresponding to input gradation value 16 is from 1.99 to 3.59. The gradation value satisfying this condition is 14 to 19 (tolerance range) according to FIG. 19. That is, the output gradation value for the gradation correction table to input gradation value 16 of cyan is required to be one of the values within the above tolerance range.

It is noted that, although it is desirable to provide, as the tolerance range, the color which does not cause discomfort to the human's eye and/or the value which is independent for each gradation value, the tolerance range may be the same value at the same gradation value for the difference color or the same value for the same color regardless of the gradation value. Further, for the gray, a part of or all of the $L^*$ component, the $a^*$ component, the $b^*$ component, and the color difference may be used for the tolerance range and/or the determination. Further, for the single color, instead of the color difference, the lightness difference or density difference may be used for the tolerance range and/or the determination.

Next, the gradation correction table is changed so that the gradation value which is not included in the predetermined tolerance range is included in that predetermined tolerance range. For example, when T07 and T08 only are not included in the predetermined tolerance range, the target values of T07 and T08 are defined from the measured color values of T06 and T09 including T07 and T08 therebetween by the linear polation, and the gradation correction table is changed so that the target values are obtained by using the estimation model function and so that respective gradation correction tables for cyan, magenta, and yellow satisfy the above described condition for the integrated color difference of respective single colors.

It is noted that the tolerance range of the color difference that tolerates the gradation collapse, which is initially set to 0.8, and the tolerance range of the integrated color difference may be expanded every time when step S702 is passed. This prevents the situation that the gradation correction table satisfying the completion condition is not created for long time. Further, there is a case where there is an incompatibility between that the range in which the measured color value is supposed to exist for a gradation value (the first condition) is satisfied and that the second condition for each gradation correction table is satisfied. In order to address this case, the priority for the conditions may be predefined or selected by the operator.

Further, the gradation correction table other than T07 and T08 may not be changed, or the gradation value that has once been included in the predetermined tolerance range at step S702 or step S505 may not be changed during the following step S604. In this case, the number of the gradation values to be changed does not increase (step S703).

Next, the gradation correction processing unit 204 utilizes the gradation correction table to make the output to the image forming device 103, and the image forming device 103 prints (outputs) the chart illustrated in FIG. 6 on the print paper and measures the color of 3C gray patch line 605 of the chart printed at the color measuring device 104 (step S704).

Similarly to step S702, the range in which the measured color value for each gradation of the black and gray is supposed to exist is calculated from the measurement result of the chart illustrated in FIG. 6 outputted using the latest gradation correction table, and, if the measured color values of gray T01 to T31 and black K01 to K31 are included in the range to exist and if the output gradation values to the input gradation values for respective gradation correction tables for cyan, magenta, and yellow are included in the predetermined tolerance range, step S604 ends, otherwise, step S703 is again entered (step S705).

As described above, in the present embodiment, the condition that the gradation correction parameter is required to satisfy is predefined so as not to cause the gradation collapse for a single color and, under such the condition, the gradation correction parameter is determined so as not to cause the gradation collapse of the mixed color. Thus, the gradation collapse of the single color and the gradation collapse of the mixed color (gray for C=M=Y) are suppressed at the same time.

Further, the linear interpolation of the measured color values for the neighboring gradation values allows the tolerance range to be determined independently of the inclination of the gradation characteristics (color difference 0 is defined as the best state). For example, for the gray of gradation values C=M=Y=24, the measured color values ($L^*$, $a^*$, $b^*$) for gradation value 16 and gradation value 32 are averaged, and it is determined such that the color difference from the measured color value for gradation value 24 is less than or equal to the predetermined value.

Further, instead of the three-dimensional $L^*$, $a^*$, and $b^*$, the use of the integrated color difference that is the one-dimensional numeral value allows for easier calculation process. The gray of C=M=Y to which the human's eye is sensitive is provided to the condition, so that the quality of the gradation correction parameter can be improved. Furthermore, when the gradation collapse for a single color and the gradation collapse for the mixed color cannot be suppressed at the same time, the desired gradation correction parameter can be obtained by allowing the user to make a decision.

Figure 22:
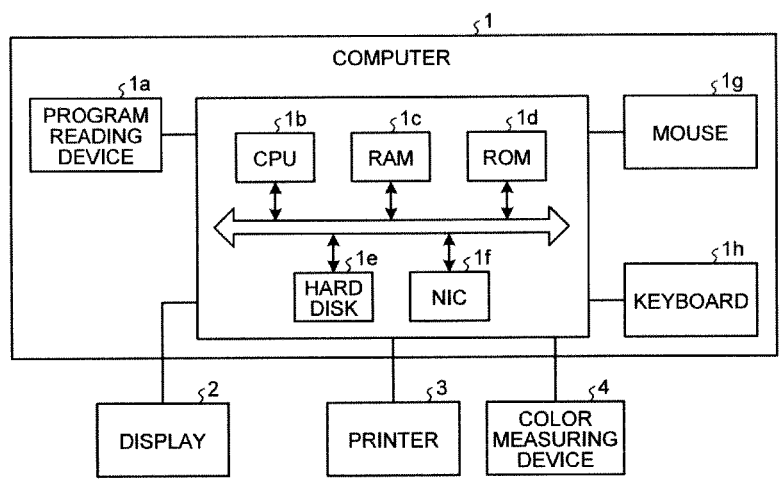
FIG. 22 is a block diagram illustrating an example of a hardware configuration of an image processing apparatus when the present invention is implemented by software.

FIG. 22 illustrates an example of a hardware configuration of the image processing apparatus when the present invention is implemented in software. A computer 1 includes a program reading device 1a, a CPU 1b for controlling the whole, a RAM 1c used as a work area and the like of the CPU 1b, a ROM 1d in which a control program for the CPU 1b and the like are stored, a hard disk 1e, a NIC 1f for communicating with equipment in the network, a mouse 1g, a keyboard 1h, a display 2 for displaying the image data and on which the user can directly touch on the screen to input information, an image forming device 3 such as a color printer and the like, and a color measurement device 4. This image processing apparatus can be implemented with, for example, a workstation, a personal computer, and the like.

In such the configuration, the functions of the image processing unit, and the gradation correction table creation unit illustrated in FIG. 1 can be held in the CPU 1b and the storage device such as the RAM 1c, the ROM 1d, and the DISK 1e can be utilized in storing the gradation correction table, the image data, the data of the chart, and so on. It is noted that the processing function executed at the CPU 1b can be provided in the form of, for example, a software package, specifically, an information recording medium such as a CD-ROM, a magnetic disk, and the like. Therefore, in the example illustrated in FIG. 22, a medium driver (not illustrated) for driving the information recording medium when it is set is provided.

As described above, the image processing method of the present invention can be implemented in a device configuration that causes a program recoded in an information recording medium such as a CD-ROM to be loaded to a general computing system having a display and the like and causes a central processing unit of the general computing system to execute the image processing. In this case, the program for executing the image processing of the present invention, that is, the program used in a hardware system is provided in a state where it has been recorded in a recording medium. The information recording medium in which the program and the like is recoded is not limited to the CD-ROM and may be a ROM, a RAM, a flash memory, or an optical magnetic disk. When installed in a storage device embedded in the hardware system such as the hard disk 1e and executed, the program recoded in the recording medium can implement the image processing function. Further, the program for implementing the image processing method and the like of the present invention is not limited to be provided in the form of the recording medium and may be provided, for example, from a server by communication via the network.

The present invention allows for creation of the gradation correction table in which the gradation collapse due to the sudden change in the gradation is suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image forming unit configured to output, on a predetermined medium, a chart including a plurality of gradation values for each of a plurality of color materials;
a color measuring unit configured to measure the output chart;
a creation unit configured to determine, for each gradation of each color, a target color based on the measurement result and create a gradation correction table of input gradation values and corresponding output gradation values, so as to obtain the target color for said each gradation of each color; and
a processing unit configured to convert an input gradation value of image data into an output gradation value in the image forming unit with referring to the created gradation correction table;
wherein, after creating the gradation correction table of input gradation values and corresponding output gradation values, the creation unit changes selected gradation values in the gradation correction table (i) to obtain a measured color value difference of neighboring gradations of the same color material that is included in a predefined tolerance range or (ii) to obtain an amount in change of a measured color value difference of the neighboring gradations that is included in a predefined tolerance range.

2. The image processing apparatus according to claim 1, wherein the tolerance range of the measured color value difference of the neighboring gradations or the tolerance range of the amount in change of the measured color value difference of the neighboring gradations is defined for a mixed color in which gradation values for cyan, magenta, and yellow are equal.

3. The image processing apparatus according to claim 1, wherein the tolerance range of the measured color value difference of the neighboring gradations or the tolerance range of the amount in change of the measured color value difference of the neighboring gradations is defined for each single color of cyan, magenta, yellow, and black.

4. The image processing apparatus according to claim 1, wherein the target color is defined for at least a mixed color in which gradation values of cyan, magenta, and yellow are equal.

5. The image processing apparatus according to claim 1, wherein the measured color value difference is a color difference, a color component difference, a lightness difference, or a density difference.

6. An image processing method comprising:
an image forming step of outputting, on a predetermined medium, a chart including a plurality of gradation values for each of a plurality of color materials;
a color measuring step of measuring the outputted chart;
a creation step of determining, for each gradation of each color, a target color based on the measurement result and creating a gradation correction table of input radation values and corresponding output gradation values, so as to obtain the target color for said each gradation of each color; and
a processing step of referring to the created gradation correction table to convert an input gradation value of image data into an output gradation value in the image forming step;
wherein, after creating the gradation correction table of input gradation values and corresponding output gradation values, the creation step changes selected gradation values in the gradation correction table (i) to obtain a measured color value difference of neighboring gradations of the same color material that is included in a predefined tolerance range or (ii) to obtain an amount in change of a measured color value difference of the neighboring gradations that is included in a predefined tolerance range.

7. An image processing apparatus comprising:
an image forming unit configured to output, on a predetermined medium, a chart including a plurality of gradation values for each of a plurality of color materials;
a color measuring unit configured to measure the outputted chart;
a creation unit configured to determine, for each gradation of each color, a target color based on the measurement result and create a gradation correction table so as to obtain the target color; and
a processing unit configured to convert an input gradation value of image data into an output gradation value in the image forming unit with referring to the created gradation correction table,
wherein the creation unit creates a gradation correction table for each single color such that a measured color value for each gradation of a mixed color is included in a predetermined range as a first condition, and an output gradation value, corresponding to an input gradation value of the gradation correction table for the each single color, is included in a predetermined range as a second condition.

8. The image processing apparatus according to claim 7, wherein the creation unit changes the gradation correction table such that a color difference between a value derived by linear-interpolating neighboring measured color values for a particular gradation value of the mixed color and a measured color value for the particular gradation value is included in a predetermined range.

9. The image processing apparatus according to claim 7, wherein the creation unit changes the gradation correction table such that an output gradation value to an input gradation value of a gradation correction table of the each single color is included in a predetermined range that is determined based on an integrated color difference from a white on a paper or from a maximum density.

10. The image processing apparatus according to claim 9, wherein the creation unit derives a color difference of neighboring gradation values based on a measured color value for each gradation value of each single color, predetermines a relationship between the integrated color difference in which the color differences from the white of the paper or from the maximum density are integrated and the each gradation value, determines a tolerance range of the gradation value in which the integrated color difference is a value within a tolerance range based on the relationship under a condition that an intermediate value of an integrated color difference for a gradation value of the each single color that corresponds to first and second output gradation values for first and second input gradation values neighboring to a particular input gradation value of the gradation correction table for the each single color is within a predetermined tolerance range, and creates the gradation correction table for each single color such that a particular output gradation value to the particular input gradation value of the gradation correction table of the each single color is included in the tolerance range of the determined gradation value.

11. The image processing apparatus according to claim 7, wherein the first condition is defined for a mixed color in which gradation values of cyan, magenta, and yellow are equal.

12. The image processing apparatus according to claim 7, wherein the measured color value is a value in a space of a color of $L^*$, $a^*$, and $b^*$.

13. The image processing apparatus according to claim 7, wherein the creation unit selects one of the first condition and the second condition according to a predefined priority.

\* \* \* \* \*